Dec. 17, 1968         C. D. HOY         3,417,272

TENSIONED ROTOR CONSTRUCTION FOR DYNAMOELECTRIC MACHINES

Filed June 16, 1966         2 Sheets-Sheet 1

INVENTOR.
CHARLES D. HOY
By White & Haefliger
ATTORNEYS.

Dec. 17, 1968  C. D. HOY  3,417,272
TENSIONED ROTOR CONSTRUCTION FOR DYNAMOELECTRIC MACHINES
Filed June 16, 1966  2 Sheets-Sheet 2
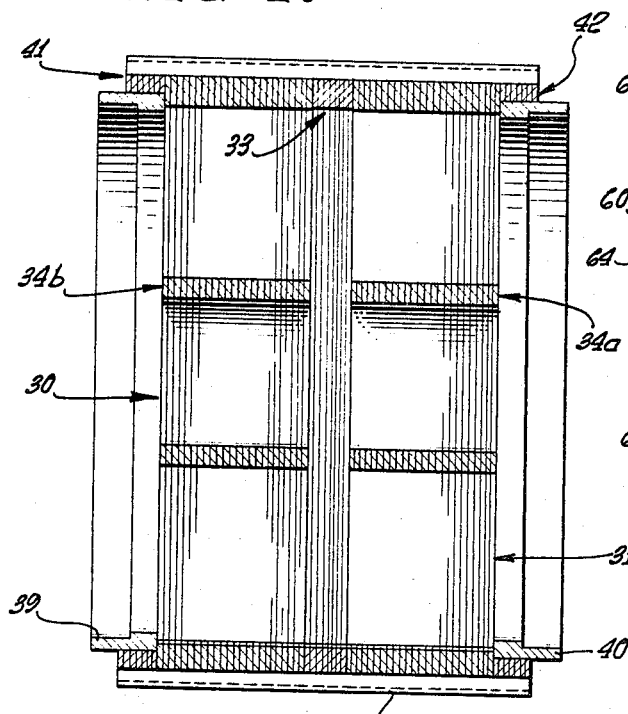
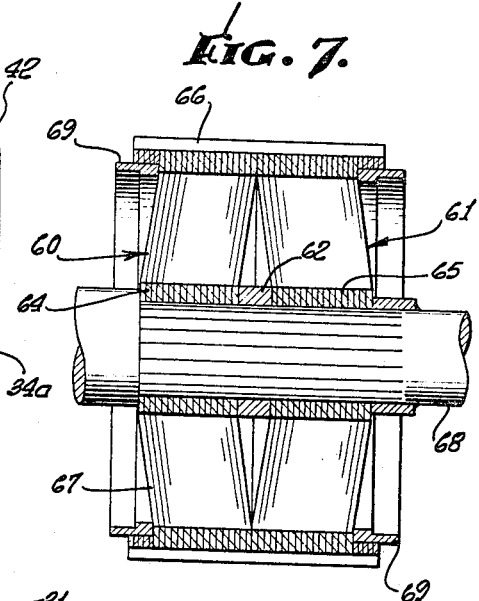
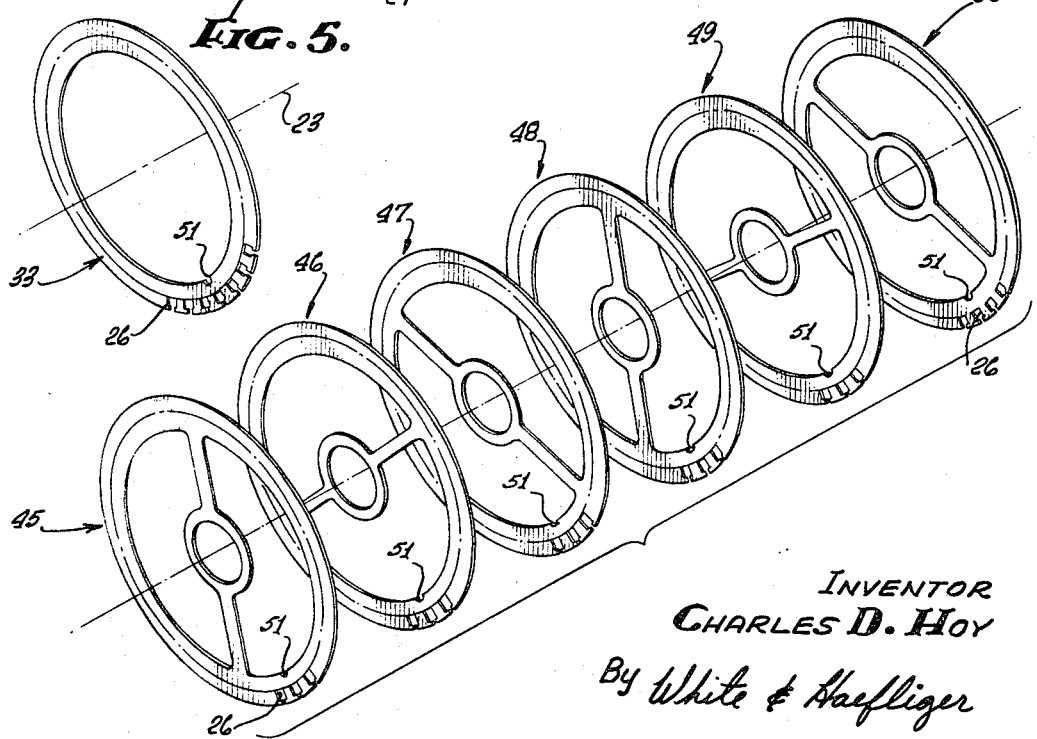
INVENTOR
CHARLES D. HOY
By White & Haefliger
ATTORNEYS.

United States Patent Office 3,417,272
Patented Dec. 17, 1968

3,417,272
TENSIONED ROTOR CONSTRUCTION FOR DYNAMOELECTRIC MACHINES
Charles D. Hoy, Anaheim, Calif., assignor to Task Corporation, Anaheim, Calif., a corporation of California
Filed June 16, 1966, Ser. No. 558,094
10 Claims. (Cl. 310—261)

This invention relates generally to electrical machines, and more particularly concerns the construction of rotors of electrical motors and generators.

The operation of electrical motors and generators is accompanied by the production of heat. Efforts to remove or transfer such heat from electrical machines have usually involved flowing cooling fluid in heat transfer proximity to the stator, inasmuch as the stator is more openly exposed for heat exchange purposes than the rotor. Cooling of rotors has been promoted in some instances by providing cooling fluid flow passages formed between rotor spokes; however, it is found that such spokes do not adequately support the rotor, against axial and radial loading, particularly where the rotor comprises stacked laminations subjected to high acceleration and deceleration in use.

It is a major object of the present invention to overcome the above problems as well as others encountered in the construction and operation of electrical machines. Basically, the invention achieves the object through the provision of a tensioned rotor construction, characterized by rotor laminations having spokes and assembled in such manner that the spokes become deflected and placed in tension, thereby to provide an extremely rigid or solid overall rotor assembly. Typically, the laminations include stacked inner and outer portions which may be annular, hub portions to be assembled on the rotor shaft, and thin spokes interconnecting said outer portions and the hub portions, and the latter are assembled to be axially offset with respect to their respective outer portions to place the spokes in tension. Further, the laminations may be assembled to be relatively rotated with respect to one another and about the shaft axis; whereby the spokes of some laminations are rotated about the axis with respect to the spokes of other laminations to increase the strength and rigidity of the rotor assembly.

Other objects and advantages of the invention include the incorporation of the stacked laminations in two groups characterized in that the spokes of each group taper inwardly in a direction toward the other group, or may taper outwardly toward the other group, structure being provided to hold the outer portions and hub portions of the laminations in such axially offset relation; and the provision of such structure in the form of other stacked laminations located between the two groups of laminations, or located at opposite ends of the two groups of laminations.

These and other objects and advantages of the invention, as well as the details of illustrative embodiments, will be more fully understood from the following detailed description of the drawings, in which:

FIG. 4 is a view like FIG. 1, but showing the rotor before assembly on the rotor shaft;

FIG. 5 is a view like FIG. 3, but showing another form of lamination used in FIG. 1;

FIG. 6 is an exploded perspective illustration of a series of spoked rotor laminations as used in the FIG. 1 construction; and FIG. 7 is a side elevation taken in section to show another form of rotor construction.

Figure 1:
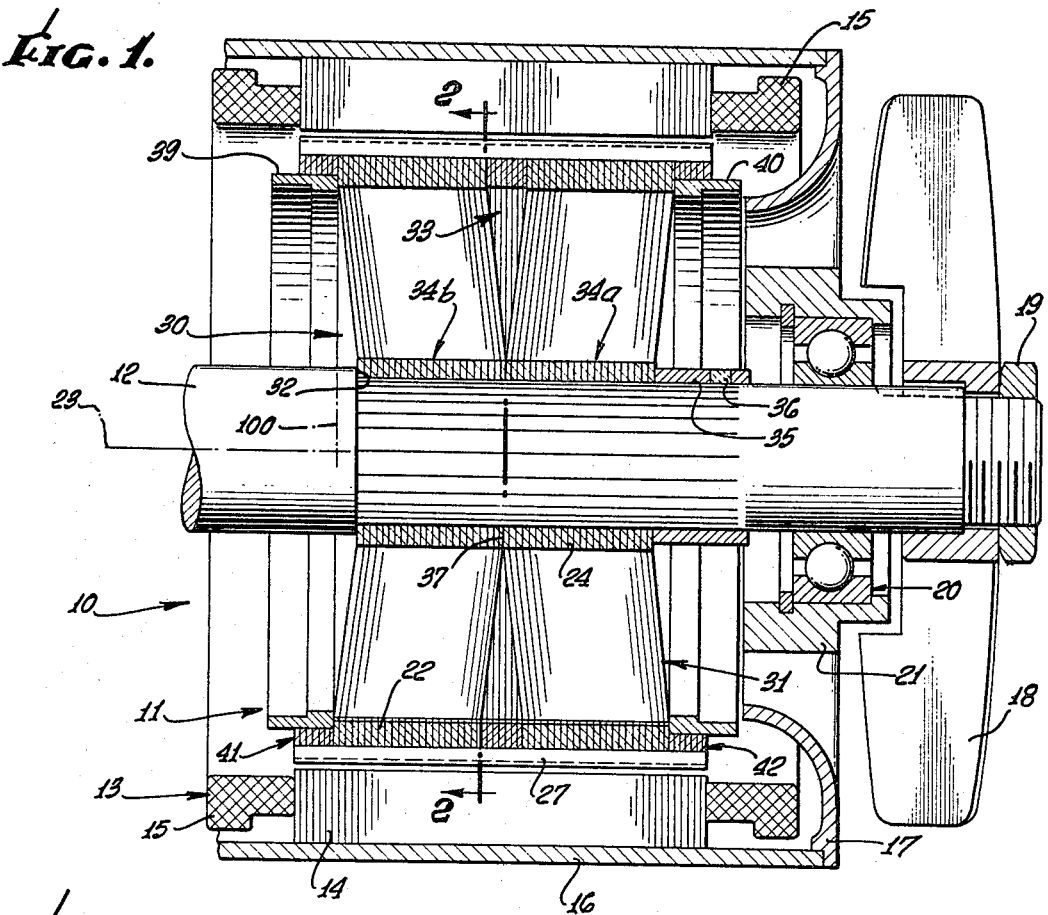
FIG. 1 is a side elevation taken in section showing an electrical machine incorporating the invention.

Referring first to FIG. 1, the electrical machine may comprise an electrical motor 10 having a rotor assembly 11 mounted on a shaft 12, and a stator assembly 13. The latter includes axially stacked laminations 14 through which conductive bars extend in squirrel cage configuration, and end rings 15, the construction being usual. A housing 16 extends about the stator and has supports on end bell 17 to guide cooling air to flow through the rotor interior. Such air may be displaced as by a fan 18 suitably attached to the rotor shaft at 19. The shaft may be bearing supported, as indicated at 20, to housing structure 21.

Figure 3:
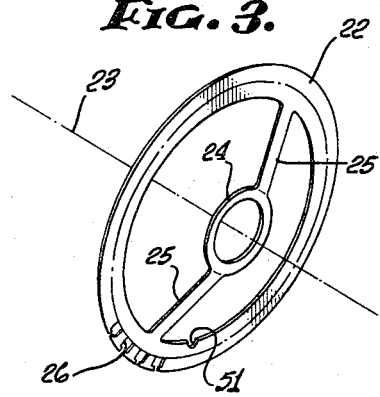
FIG. 3 is a perspective showing of a rotor lamination with hub portion offset to place the spokes in tension.

In accordance with the invention, the stabilized rotor construction comprises stacked laminations, defining an axis and having inner and outer portions extending about the axis and tensioned spokes integral with the outer portions and directed inwardly toward the axis in angular relation to a plane normal to the axis. Referring to FIGS. 1 and 3, a lamination incorporating the invention includes an annular outer portion 22 extending about axis 23, a hub portion 24 to be assembled on the shaft 12, and tensioned spokes 25 interconnecting portions 22 and 24 and extending angularly with respect to a plane 100 normal to axis 23, the hub portion 24 being axially offset with respect to the outer annular portion 22. The outer annular portions of the laminations typically are slotted as at 26 to retain rotor bars 27 forming the usual squirrel cage configuration about axis 23 in the assembly.

As seen in FIGS. 1 and 4, the rotor laminations are stacked in two groups 30 and 31 for assembly upon the shaft 12. Such assembly is carried out so that the spokes of each group taper inwardly in a direction toward the other group, i.e. the spokes of group 30 taper rightwardly toward group 31, and the spokes of group 31 taper leftwardly toward group 30. In carrying out such assembly, the left group 30 is placed on shaft 12 so that the hub portion 24 engages shaft shoulder 32. In this regard, a series of laminations 33 as seen in FIG. 5 is held in position between the annular outer portions of the lamination groups 31 and 32 as by the rotor bars 27. Thereafter, the hub portions 34a of group 31 are urged toward the hub portions 34b of group 30 as by a sleeve 35 to be suitably affixed to the shaft, as by the weld 36, the hub portions typically being held in engagement at 37. As a result, the spokes 25 are placed in tension, the anular portions 22 and 24 remain in generally radially extending planes as seen in FIG. 1, and the rotor construction becomes rigidly mounted on the shaft to very strongly resist deflection axially and radially. Note also the electrically conductive end rings 39 and 40 respectively and coaxially carried by the groups 31 and 32, and the annular end laminations 41 and 42 connected to the rotor bars and coaxially mounting those end rings.

Figure 2:
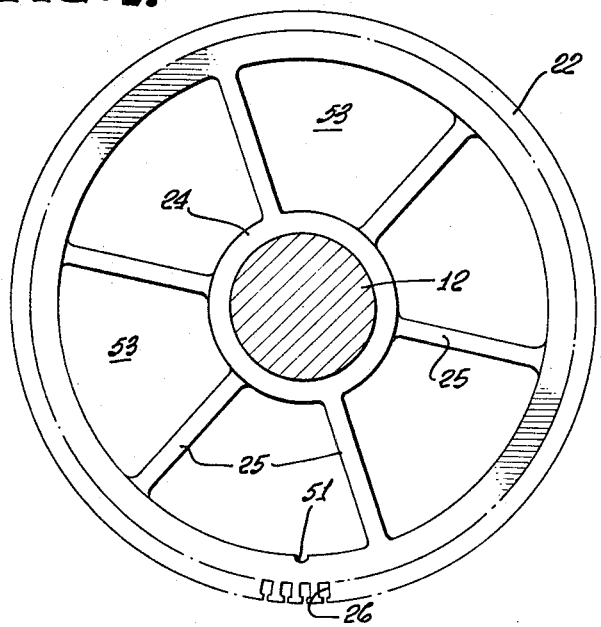
FIG. 2 is a section taken on line 2—2 of FIG. 1.

A further feature, enchancing the rigidity of the rotor mounting on the shaft, resides in the relative rotation of the spoked laminations with respect to one another and about axis 23 so that the spokes of some laminations are rotated about that axis with respect to the spokes of other laminations. One unusually advantageous example of this is seen in FIG. 6, showing a series of laminations 45, each of construction as seen in FIG. 3. The spokes of successive laminations are rotated sixty degrees, so that the spokes of laminations 45 and 48 are parallel, spokes of laminations 46 and 49 are parallel, and spokes of laminations 47 and 50 are parallel. Alignment of notches 51 in all of these laminations during their assembly facilitates the described relative orientation of the spokes. Note the large axially open passages between the spokes for flow of cooling air, as seen at 53 in FIG. 2.

In the modified construction of FIG. 7, the spokes of lamination group 60 taper outwardly in a rightward direction toward lamination group 61, and the spokes of lamination group 61 taper outwardly on a leftward direction toward group 60. A sleeve 62 separates the hub portions 64 and 65 of the groups, while rotor bars 66 hold the outer annular portions of the two groups of laminations in end-to-end relation, thereby to place the spokes 67 in tension for rigid mounting of the assembly on shaft 68. Rotor end rings appear at 69.

I claim:

1. A stabilized rotor construction for an electrical machine, comprising stacked laminations defining an axis and having inner and outer portions extending about said axis and tensioned spokes integral with said portions and directed inwardly toward said axis in angular relation to a plane normal to said axis.

2. The rotor of claim 1, in which said inner portion is in the form of a hub axially offset with respect to said outer portion of that lamination.

3. The rotor of claim 1, in which said laminations are rotated with respect to one another and about said axis so that the spokes of some laminations are rotated about said axis with respect to the spokes of other laminations.

4. The rotor of claim 2, in which said laminations form two groups characterized in that the spokes of each group taper inwardly in a direction toward the other group, structure holding the outer portions and hub portions of said two groups of laminations in position, and rotor bars carried by the outer portions of said two groups of laminations.

5. The rotor of claim 4, in which said structure includes other laminations stacked between the outer portions of said two groups of laminations, said other lamination being free of spokes.

6. The rotor of claim 5, including a shaft extending through and mounting said hub portions, additional laminations free of spokes and stacked at opposite ends of said two groups of laminations, said structure including sleeve means on the shaft and holding the hub portions of said two groups of laminations in position.

7. The rotor of claim 2, in which said laminations form two groups characterized in that the spokes of each group taper outwardly in a direction toward the other group, structure holding the outer portions and hub portions of said two groups of laminations in position, and rotor bars carried by the outer portions of said two groups of laminations.

8. The rotor of claim 7, in which said structure includes other laminations free of spokes and stacked at opposite ends of said two groups of laminations.

9. The rotor of claim 8, including a shaft extending through and mounting said hub portions.

10. The rotor of claim 2, including a shaft extending through and mounting said hub portions, and a stator extending about said rotor and outwardly of said tensioned spokes.

References Cited

UNITED STATES PATENTS

| | | | |
|---|---|---|---|
| 406,858 | 7/1889 | Schmid | 310—265 |
| 538,344 | 4/1895 | Penn et al. | 310—265 X |
| 1,762,017 | 6/1930 | Grenzer | 29—598 |

WARREN E. RAY, *Primary Examiner.*